US008510601B1

(12) United States Patent
Desai et al.

(10) Patent No.: US 8,510,601 B1
(45) Date of Patent: Aug. 13, 2013

(54) GENERATING SERVICE CALL PATTERNS FOR SYSTEMS UNDER TEST

(75) Inventors: Nirav J. Desai, Issaquah, WA (US); Stanislava R. Vlasseva, Seattle, WA (US); Kyle Andrew Farrell, Seattle, WA (US); Michael C. Moore, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 362 days.

(21) Appl. No.: 12/890,791

(22) Filed: Sep. 27, 2010

(51) Int. Cl.
*G06F 11/00* (2006.01)
(52) U.S. Cl.
USPC .......................................................... 714/27
(58) Field of Classification Search
USPC .......................................................... 714/27
See application file for complete search history.

(56) References Cited

U.S. PATENT DOCUMENTS

| 2008/0086348 A1* | 4/2008 | Rao et al. ........................... 705/7 |
| 2008/0086499 A1* | 4/2008 | Wefers et al. .................. 707/102 |
| 2009/0019428 A1* | 1/2009 | Li et al. ........................... 717/128 |

* cited by examiner

*Primary Examiner* — Bryce Bonzo
(74) *Attorney, Agent, or Firm* — Thomas | Horstemeyer, LLP.

(57) ABSTRACT

Disclosed are various embodiments for generating a service call pattern for a system. A monitor is installed on a first and a second service call channel. Each service call channel is used by a first and second system under test, respectively. Through the monitor, service calls are received from the respective system under test. The service calls are issued to at least one service. A first service call pattern is generated based at least in part on the plurality of service calls issued by the first system under test. A second service call pattern is generated based at least in part on the plurality of service calls issued by the second under test. The first service call pattern report and the second service call pattern report are compared. An error condition if the comparison indicates a difference greater than a predefined threshold.

21 Claims, 6 Drawing Sheets

GENERATING SERVICE CALL PATTERNS FOR SYSTEMS UNDER TEST

BACKGROUND

A common software architecture in use today is one based on software services, where software components communicate with each other over a network and each component exposes a set of service calls to be invoked by other components. In testing a software system that is built on software services, it is sometimes useful to instrument the software components to record the particular set of service calls that is invoked as a result of executing under a particular set of test stimuli. Such instrumentation code may be added to either the caller or the callee. However, instrumentation code must be maintained, and updated when new service calls are added. Furthermore, changing the source code on the callee is not always possible when that code is owned or maintained by a third party. Finally, recording all the service calls results in a large amount of data which must then be reviewed to discover useful information.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to testing systems which communicate with other components through service calls over a network. Service calls by a system under test are monitored and information about the service calls is recorded. The services may be provided by internal or external (third party) components. In some embodiments, the system under test is a set of software components, and the service calls made by the system under test are to other software components. The service call information is used to generate a pattern of service calls made by a particular system under test when a particular set of test inputs is applied. A comparison of the differences in the two service call patterns may be provided. In some embodiments, an error condition may be reported if the comparison indicates a difference greater than a predefined threshold. By generating service call patterns for different systems under test and then comparing the service call patterns, differences between the systems under test can be identified and isolated. Because the information is generated through monitoring, there is no need to alter the system under test by adding test instrumentation code.

Figure 1:
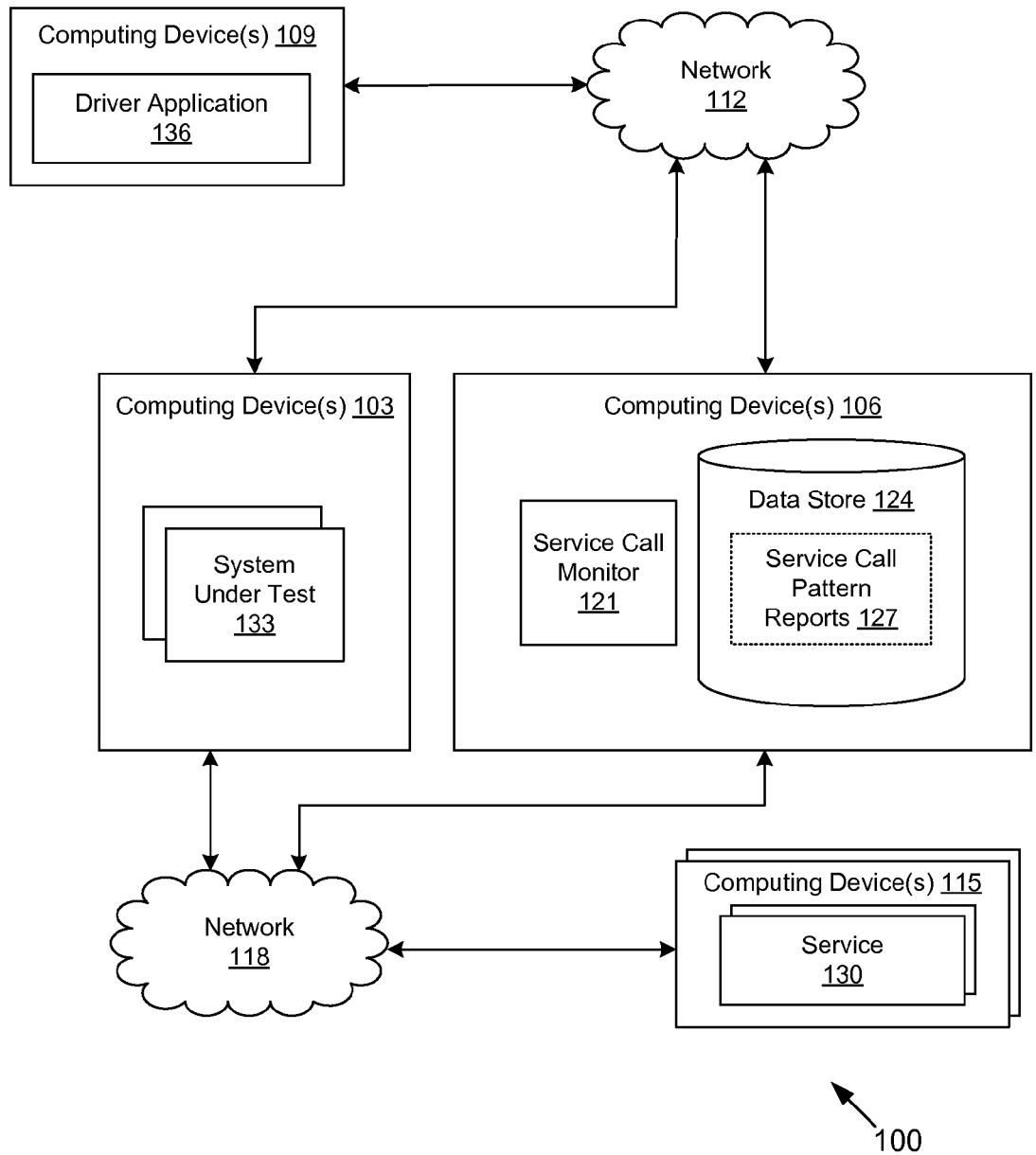
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 106, and one or more computing devices 109, in data communication with each other by way of a network 112. The computing devices 103 and 106 are also in data communication with one or more computing devices 115 by way of a network 118. The networks 112 and 118 include, for example, the Internet, intranets, extranets, wide area networks (WANs), local area networks (LANs), wired networks, wireless networks, or other suitable networks, etc., or any combination of two or more such networks.

Each of the computing devices 103, 106, 109, 115 may comprise, for example, a server computer or any other system providing computing capability. Alternatively, a plurality of computing devices 103, 106, 109, 115 may be employed that are arranged, for example, in one or more server banks or computer banks or other arrangements. A plurality of computing devices 103, 106, 109, 115 together may comprise, for example, a cloud computing resource, a grid computing resource, and/or any other distributed computing arrangement. Such computing devices 103, 106, 109, 115 may be located in a single installation or may be distributed among many different geographical locations. For purposes of convenience, each of the computing devices 103, 106, 109, 115 is referred to herein in the singular. Even though a computing device 103, 106, 109, 115 is referred to in the singular, it is understood that a plurality of each computing device 103, 106, 109, 115 may be employed in the various arrangements as described above.

Various applications and/or other functionality may be executed in the monitor computing device 106 according to various embodiments. The components executed on the monitor computing device 106, for example, include a service call monitor 121. The service call monitor 121 is executed to monitor service calls from one system to another, and to generate a pattern representing the service calls issued by a particular system under a particular set of inputs. The components executed on the monitor computing device 106 may also include other applications, services, processes, systems, engines, or functionality not discussed in detail herein.

Also, various data is stored in a data store 124 that is accessible to the monitor computing device 106. The data store 124 may be representative of a plurality of data stores as can be appreciated. The data stored in the data store 124, for example, is associated with the operation of the various applications and/or functional entities described below. The data stored in the data store 124 includes data accessed by the service call monitor 121, for example, service call pattern reports 127 as well as potentially other data.

Various applications and/or other functionality may be executed in the service provider computing device 115 according to various embodiments. The components executed on the service provider computing device 115, for example, include a service 130. The service 130 is executed to provide a service to a remote caller, through a service call invoked over the network 118. In various embodiments, the service call may utilize any type of middleware framework such as remote procedure calls, service-oriented architecture protocol (SOAP), representational state transfer (REST), Windows Communication Foundation, and other frameworks. The components executed on the service provider computing device 115 may also include other applications, services, processes, systems, engines, or functionality not discussed in detail herein.

Various applications and/or other functionality may be executed in the SUT computing device 103 according to various embodiments. The components executed on the SUT computing device 103, for example, include one or more systems under test 133. When executed, each system under test 133 makes service calls over the network 118 to various components executing on other computing devices, such as service 130. The components executed on the SUT computing device 103 may also include other applications, services, processes, systems, engines, or functionality not discussed in detail herein.

Various applications and/or other functionality may be executed in the test computing device 109. The components executed on the test computing device 109, for example, include a driver application 136. The driver application 136 is executed to provide a set of test stimuli to the system under test 133 which executes on the computing device 103. The components executed on the test computing device 109 may also include other applications, services, processes, systems, engines, or functionality not discussed in detail herein.

Next, a general description of the operation of the various components of the networked environment 100 is provided. To begin, the driver application 136 executing on the test computing device 109 provides a predefined set of stimuli to the system under test 133. In some embodiments, this predefined set of stimuli is part of a test case. The predefined set of stimuli causes the system under test 133 to issue various service calls over the network 118 to one or more of the services 130. The service call monitor 121 executing on the monitor computing device 106 intercepts these service calls and generates a service call pattern that is representative of the particular set of service calls issued in response to the stimuli provided by the driver application 136. A system under test that issues service calls A, B and C will have a different service call pattern than another system under test that issues service calls A, B and D. The service call monitor 121 may create a report that includes this service call pattern, where the service call pattern report is associated with the combination of a system under test 133 and a stimulus set.

The driver application 136 may run the same set of stimuli to two different systems under test, producing two service call pattern reports. For example, one system under test may be a production or "golden" system and the other may be a production candidate system. A comparison of the differences in the two service call patterns may be provided by, for example, the driver application 136, the service call monitor 121, or some other component. In some embodiments, an error condition may be reported if the comparison indicates a difference greater than a threshold, where the threshold may be a predefined value or a user-defined value.

Figure 2:
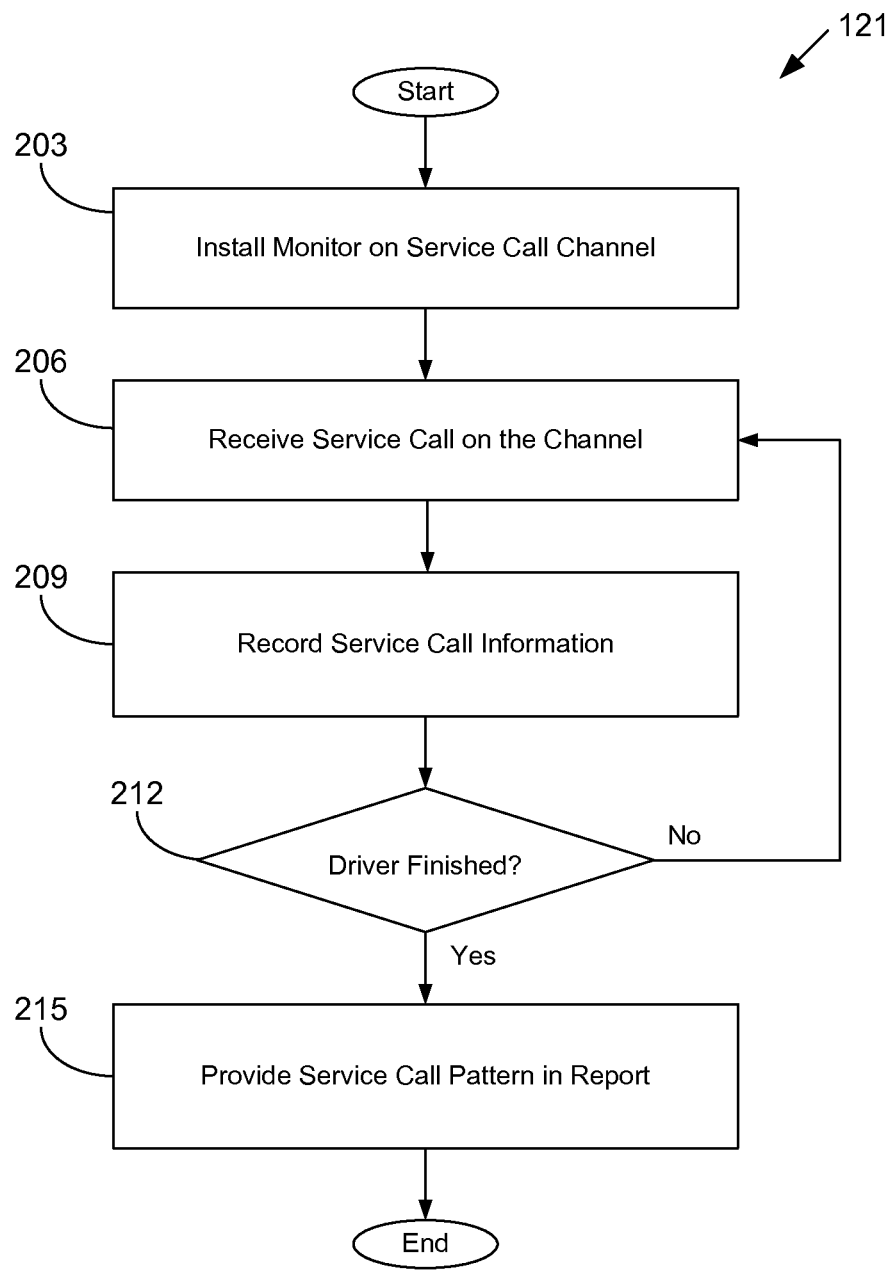
FIG. 2 is a flowchart illustrating one example of functionality implemented as portions of a service call monitor application executed in a computing device in the networked environment of FIG. 1 according to various embodiments of the present disclosure.

Referring next to FIG. 2, shown is a flowchart that provides one example of the operation of a portion of the service call monitor 121 according to various embodiments. It is understood that the flowchart of FIG. 2 provides merely an example of the many different types of functional arrangements that may be employed to implement the operation of the portion of the service call monitor 121 as described herein. As an alternative, the flowchart of FIG. 2 may be viewed as depicting an example of steps of a method implemented in the monitor computing device 106 (FIG. 1) according to one or more embodiments.

The process of FIG. 2 starts when a test case begins executing. Beginning at box 203, the service call monitor 121 installs a monitor on a channel on which the system under test 133 issues service calls to services 130. In some embodiments, this monitor is passive, such that service calls are delivered to the service call monitor 121 and to the system under test 133. In other embodiments, the monitor is responsible for forwarding the service calls on to the system under test 133. In some embodiments, the data received by the service call monitor 121 on the monitored channel is a hypertext transfer protocol (HTTP) stream. In some embodiments, the data received by the service call monitor 121 on the monitored channel is a series of service-oriented architecture protocol (SOAP) transactions. In some embodiments, the monitor is installed on the protocol stack via a sockets interface.

Next, at box 206, the service call monitor 121 receives a service call that is issued by the system under test 133 on the monitored channel. At box 209 the service call monitor 121 records information about the service call. This information may include, for example, the name of the service call, an identifier for the service call such a revision number, the number of parameters to the service call, the size of the parameters, etc. In some embodiments, the service call monitor 121 maintains a counter for each service call, and increments the corresponding counter. In some embodiments, the service call monitor 121 keeps track of the order of the service calls, while in other embodiments the order of service calls is irrelevant to the service call pattern. Some embodiments (not shown) also monitor responses to, or results returned from, service calls, and also record information about these responses.

At box 212, it is determined whether the driver application 136 has completed. If at box 212 the driver application 136 has not completed, processing continues at box 206, where another service call is received and appropriate information recorded. As service calls are received and processed, the recorded information forms the service call pattern. In this manner, the service call pattern is generated based on the recorded information. As service calls X, Y and Z are received, the information about X, Y and Z forms a service call pattern for the particular test case and system under test.

If at box 212 it is determined that the driver application 136 has completed, the processing continues at box 215, where the information recorded at box 209 is provided as a service call pattern report. In some embodiments, the recorded information undergoes further processing to produce the report. For example, information that identifies the test case and the system under test may be included in the report. In some embodiments, the service call pattern report is stored for later retrieval upon request. In other embodiments, the service call pattern report is automatically provided to another entity, for example, the driver application 136.

Figure 3:
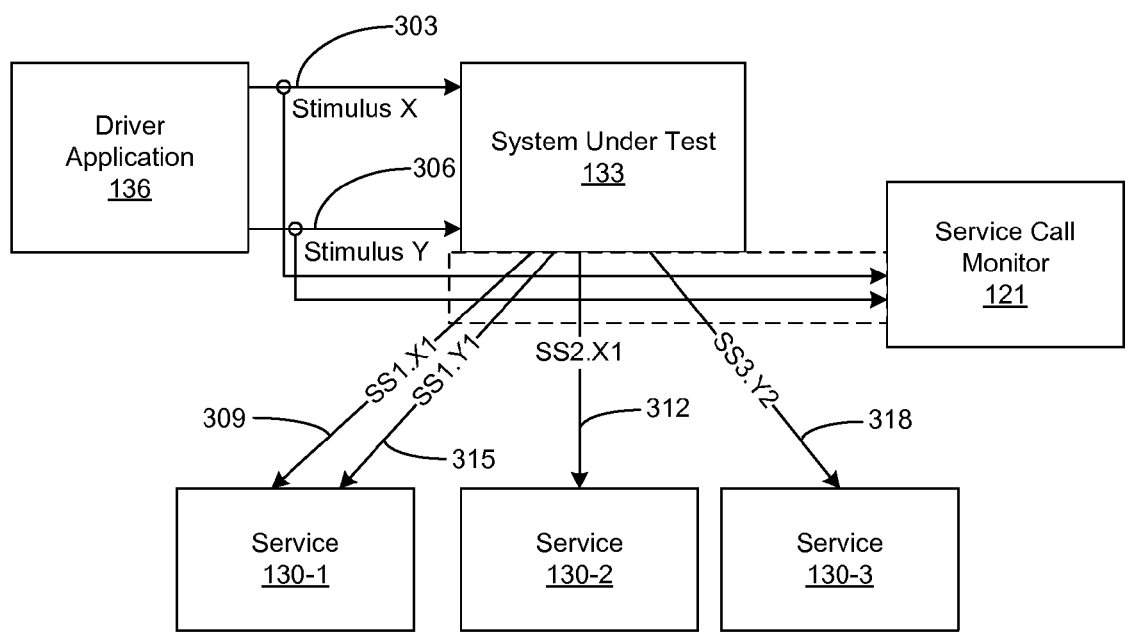
FIG. 3 is a diagram illustrating an example set of interactions between various components of the networked environment of FIG. 1 according to various embodiments of the present disclosure.

Turning now to FIG. 3, shown is a diagram that provides one example of how the service call monitor 121 interacts with various other components of FIG. 1 according to various embodiments. It is understood that the diagram of FIG. 3 provides merely an example of the many different types of functional arrangements that may be employed to implement the operation of the components as described herein. As an alternative, the diagram of FIG. 3 may be viewed as depicting an example of steps of a method implemented in the monitor computing device 106 and the test computing device 109 (FIG. 1) according to one or more embodiments.

The components shown in FIG. 3 include the service call monitor 121, the service 130, the system under test 133, and the driver application 136. As shown in FIG. 3, the service call monitor 121 monitors the service calls issued by the system under test 133 to the services 130-1, 130-2 and 130-3. The driver application 136 initiates a test of the system under test 133, providing to the system under test 133 a stimulus X (303) and a stimulus Y (306). As a result of the stimuli, the system under test 133 issues various service calls to the services 130-1, 130-2 and 130-3. Specifically, the stimulus X (303) causes the system under test 133 to issue a service call SS1.X1 (309) to service 130-1 and a service call SS2.X1 (312) to service 130-2. Stimulus Y (306) causes the system under test 133 to issue a service call SS1.Y1 (315) to service 130-1 and a service call SS3.Y2 (318) to service 130-3. The service call pattern produced by the service call monitor 121 for stimulus XY is then SS1.X1|SS2.X2|SS1.Y1|SS3.Y2.

Figure 4A:
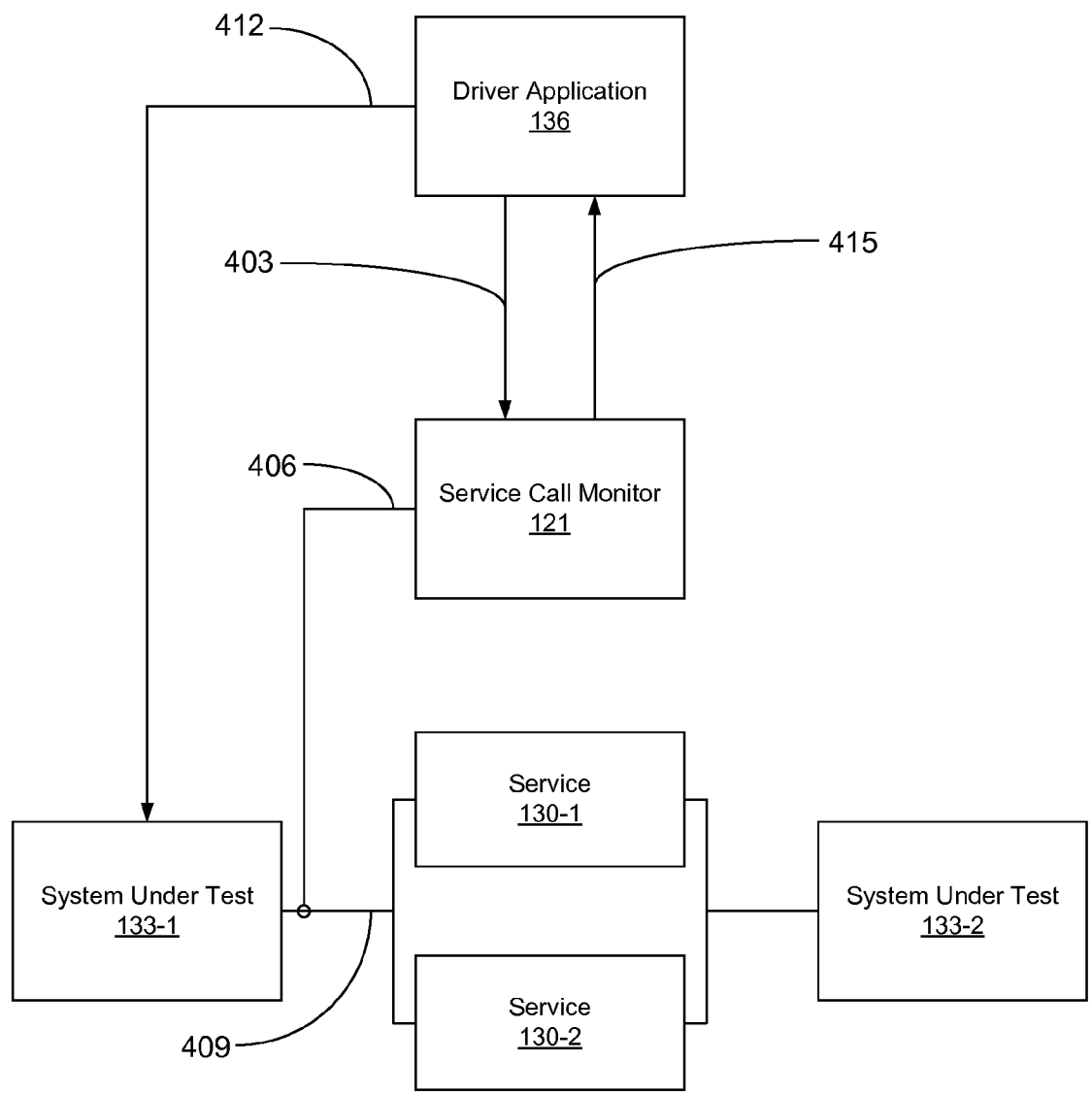
FIGS. 4A and 4B are diagrams illustrating another example set of interactions between various components of the networked environment of FIG. 1 according to various embodiments of the present disclosure.
Figure 4B:
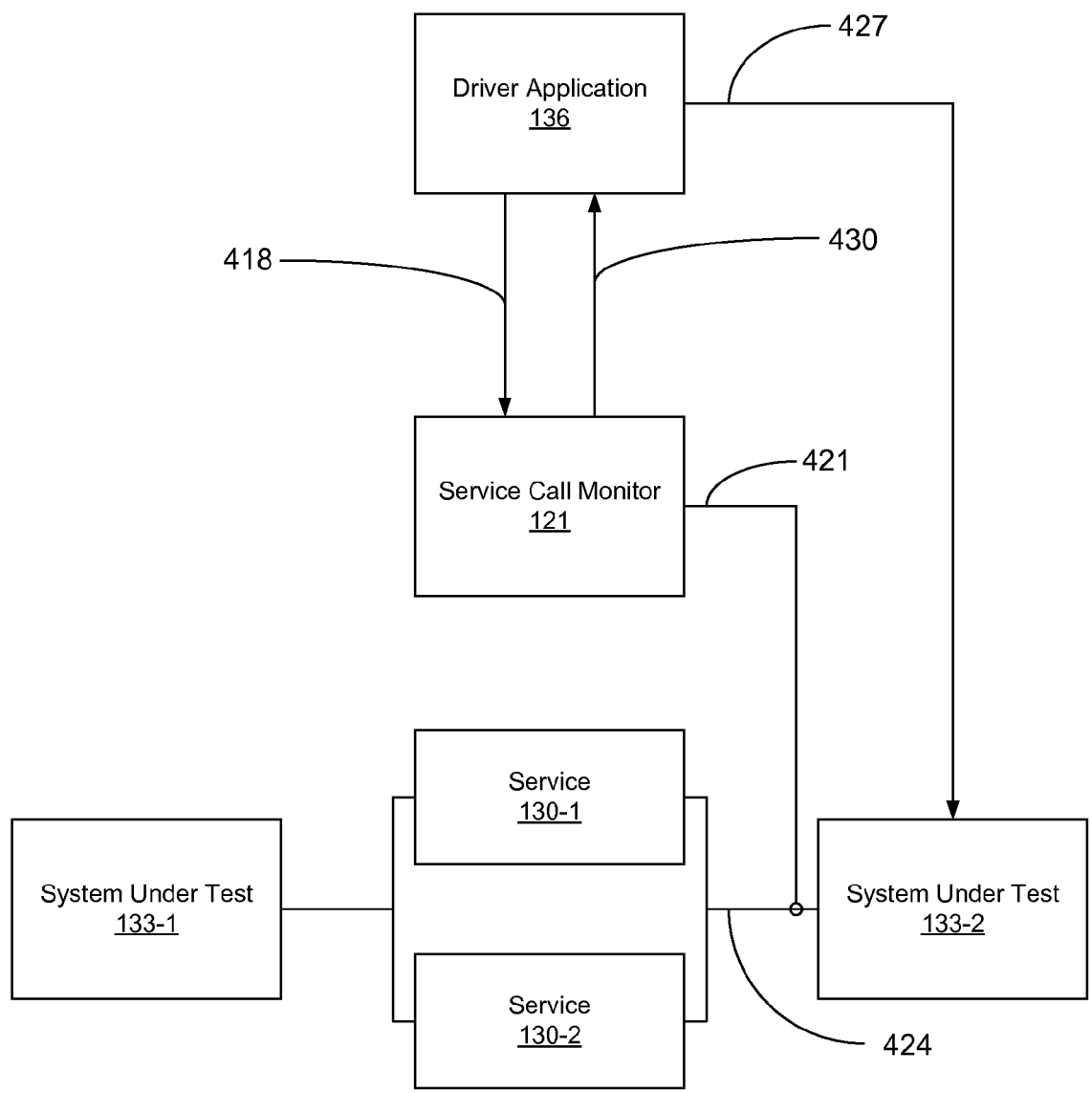

Moving on to FIGS. 4A and 4B, shown are diagrams that provide an example of how the service call monitor 121 interacts with various other components of FIG. 1 according to various embodiments. It is understood that the diagrams of FIGS. 4A and 4B provide merely an example of the many different types of functional arrangements that may be employed to implement the operation of the portion of the components as described herein. As an alternative, the flowchart of FIG. 2 may be viewed as depicting an example of steps of a method implemented in the monitor computing device 106 and the test computing device 109 (FIG. 1) according to one or more embodiments.

The components shown in FIG. 4A include the service call monitor 121, the service 130, the system under test 133-1, and the driver application 136. Starting with FIG. 4A, at step 403 the driver application 136 requests the service call monitor 121 to install a monitor on the service call channel for the system under test 133-1. As a result of the request, the service call monitor 121 installs a monitor (406) on the service call channel (409) for the system under test 133. At step 412 the driver application 136 initiates execution of the system under test 133-1 using a particular set of test stimuli. When the test completes, the service call monitor 121 provides a service call pattern report (415) to the driver application 136.

Turning now to FIG. 4B, at step 418 the driver application 136 requests the service call monitor 121 to install a monitor on the service call channel for the system under test 133-2. As a result of the request, the service call monitor 121 installs a monitor (421) on the service call channel (424) for the system under test 133-2. At step 427 the driver application 136 initiates execution of the system under test 133-2 using a particular set of test stimuli. This may be the same set of test stimuli as used for system under test 133-1, or it may be different. When the test completes, the service call monitor 121 provides a service call pattern report (430) to the driver application 136.

Figure 5:
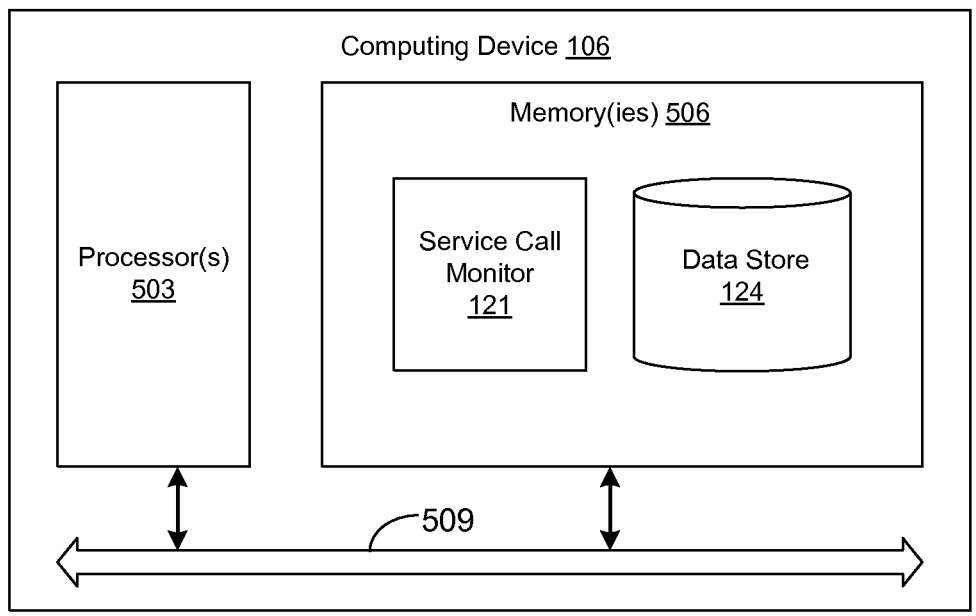
FIG. 5 is a schematic block diagram that provides one example illustration of a computing device employed in the networked environment of FIG. 1 according to various embodiments of the present disclosure.

With reference now to FIG. 5, shown is a schematic block diagram of the monitor computing device 106 according to an embodiment of the present disclosure. The monitor computing device 106 includes at least one processor circuit, for example, having a processor 503 and a memory 506, both of which are coupled to a local interface 509. To this end, the monitor computing device 106 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the service call monitor 121, and potentially other applications. Also stored in the memory 506 may be a data store 124 and other data. In addition, an operating system may be stored in the memory 506 and executable by the processor 503. While not illustrated, the SUT computing device 103 and the service provider computing device 115 also includes components like those shown in FIG. 5, whereby the services 130 and the systems under test 133 are stored in a memory and executable by a processor. Similarly, although not illustrated, the test computing device 109 also includes components like those shown in FIG. 5, whereby the driver application 136 are stored in a memory and executable by a processor.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 112 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the service call monitor 121, the service 130, the system under test 133, the driver application 136, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The diagrams of FIGS. 2, 3, 4A, and 4B show the functionality and operation of an implementation of portions of the service call monitor 121, the service 130, the system under test 133, and/or the driver application 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the diagrams of FIGS. 2, 3, 4A, and 4B may show a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIGS. 2, 3, 4A, and 4B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the service call monitor 121, the service 130, the system under test 133, and the driver application 136 that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that installs a monitor on a network communication channel through which a system under test issues a plurality of service calls to at least one service;
    code that receives, through the monitor, the plurality of service calls;
    code that records an identifier of each of the plurality of service calls;
    code that counts a number of occurrences of each of the plurality of service calls;
    code that generates a service call pattern that includes the recorded identifiers and the number of occurrences; and
    code that generates a service call pattern report,
    wherein the service call pattern report includes the service call pattern, an identifier for the system under test, and a test case identifier for a set of test stimuli corresponding to the issued plurality of service calls.

2. The computer-readable medium of claim 1, wherein the monitor is installed on a hypertext transport protocol (HTTP) stream.

3. The computer-readable medium of claim 1, wherein the monitor is installed on a service-oriented architecture protocol (SOAP) channel.

4. The computer-readable medium of claim 1, wherein the monitor is installed via a socket interface.

5. A system, comprising:
    at least one computing device; and
    a service call monitor in the at least one computing device, the service call monitor comprising:
        logic that installs a monitor that monitors a communication channel on which a system under test issues a plurality of service calls to at least one service;
        logic that receives, through the monitor, the plurality of service calls;
        logic that counts a number of occurrences of the plurality of service calls; and
    logic that generates a service call pattern based at least in part on the number of occurrences.

6. The system of claim 5, further comprising recording information about the plurality of service calls, wherein the service call pattern is further based on the recorded information.

7. The system of claim 6, wherein the recorded information includes an identifier of each of the service calls.

8. The system of claim 7, wherein the identifier comprises a name.

9. The system of claim 6, wherein the recorded information includes the number of occurrences.

10. The system of claim 5, wherein the monitor is installed on a protocol stack via a sockets interface.

11. The system of claim 5, wherein the monitor is installed on a hypertext transport protocol (HTTP) stream.

12. The system of claim 5, wherein the monitor is installed on a service-oriented architecture protocol (SOAP) channel.

13. The system of claim 5, further comprising logic that provides a service call pattern report which includes the service call pattern and an identifier of the system under test.

14. A method, comprising the steps of:
- requesting a service call monitor to install a monitor on a first service call channel used by a first system under test;
- initiating execution of the first system under test using a set of test stimuli;
- receiving a first service call pattern report generated by the service call monitor in response to the execution of the first system under test using the set of test stimuli;
- requesting the service call monitor to install the monitor on a second service call channel used by a second system under test;
- initiating execution of the second system under test using the set of test stimuli; and
- providing a comparison of the first service call pattern report and a second service call pattern report.

15. The method of claim 14, further comprising the step of receiving, in the service call monitor, a first plurality of service calls issued by the first system under test and generating the first service call pattern report based at least in part on the first plurality of service calls.

16. The method of claim 14, further comprising the steps of:
- in the service call monitor, receiving a second plurality of service calls issued by the second system under test and generating the second service call pattern report based at least in part on the second plurality of service calls; and
- receiving the second service call pattern report.

17. The method of claim 14, further comprising the step of:
- reporting an error condition if the comparison indicates a difference greater than a predefined criteria.

18. The method of claim 17, wherein the predefined criteria is user-defined.

19. The method of claim 14, further comprising the steps of:
- in the service call monitor, recording information about a first plurality of service calls, wherein the first service call pattern report is further based on the recorded information.

20. The method of claim 19, wherein the recorded information includes a name of each of the first plurality of service calls.

21. The method of claim 19, wherein the recorded information includes a count of each of the first plurality of service calls.

* * * * *